United States Patent [19]
Fortune, Sr. et al.

[11] Patent Number: 5,323,915
[45] Date of Patent: Jun. 28, 1994

[54] SECURITY BICYCLE STAND

[75] Inventors: Robert A. Fortune, Sr., Park Ridge; Burton Greenberg, Skokie, both of Ill.

[73] Assignee: Graber Products, Inc., Madison, Wis.

[21] Appl. No.: 943,904

[22] Filed: Sep. 11, 1992

[51] Int. Cl.⁵ ............................................. E05B 73/00
[52] U.S. Cl. ..................................... 211/5; 211/22; 70/62
[58] Field of Search ................. 211/5, 22; 70/58, 62, 70/233, 234, 235

[56] References Cited

U.S. PATENT DOCUMENTS

| | | | |
|---|---|---|---|
| 3,762,569 | 10/1973 | Spring | 70/235 |
| 3,783,659 | 1/1974 | Rossi | 70/234 |
| 3,827,773 | 8/1974 | Aiello | 70/234 |
| 3,865,245 | 2/1975 | Lieb et al. | 70/234 |
| 3,964,611 | 6/1976 | Galen et al. | 70/235 |
| 4,008,587 | 2/1977 | Frentzel et al. | 70/235 |
| 4,080,020 | 3/1978 | Candelaria | 70/234 |
| 4,126,228 | 11/1978 | Bala et al. | 70/234 |
| 4,830,167 | 5/1989 | Lassche | 70/225 |
| 4,862,656 | 9/1989 | Kelly | 70/62 |
| 5,040,385 | 8/1991 | Randone | 70/62 |

Primary Examiner—Paula A. Bradley
Assistant Examiner—Chuck Y. Mah
Attorney, Agent, or Firm—Ryan, Kees & Hohenfeldt

[57] ABSTRACT

A bicycle stand including a stationary upright member anchored to the ground and horizontally oriented enclosure of rectangular cross section attached to its top with an opening in one side thereof to receive a bicycle securing arm. A pivotable second member carrying three arms is adapted to engage a bicycle. One of the arms is aligned with and adapted to pass through the opening, an aperture to receive a leg of a shackle lock placed within the enclosure to lock the bicycle in the stand. A storage compartment can serve as one of the upright members and is secured by the same lock.

11 Claims, 3 Drawing Sheets

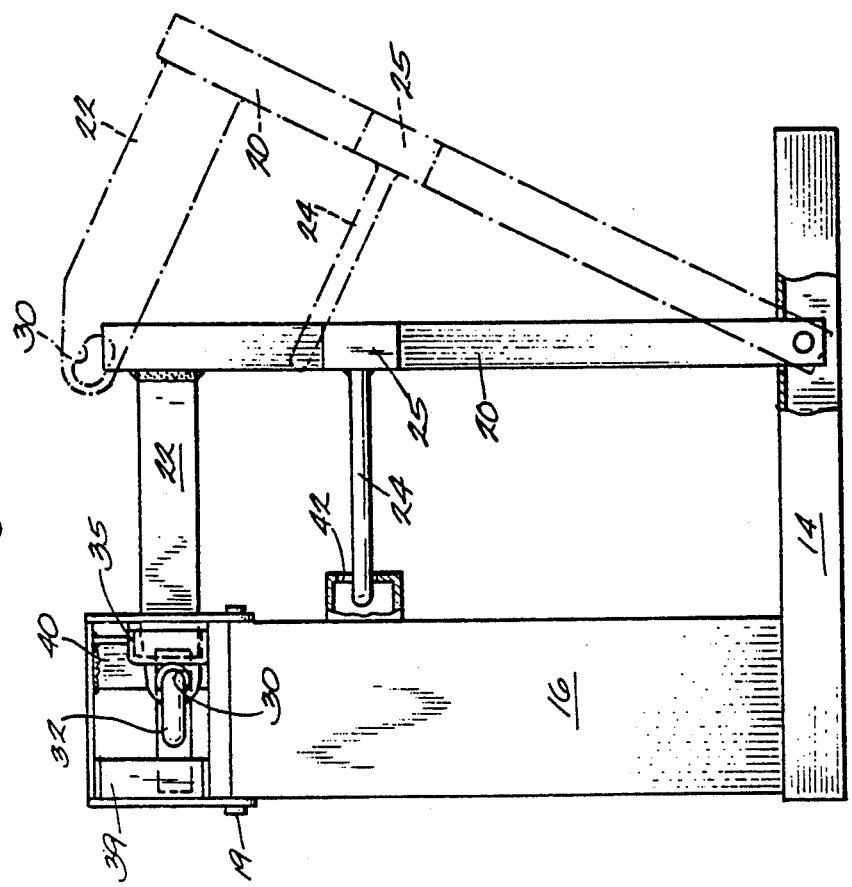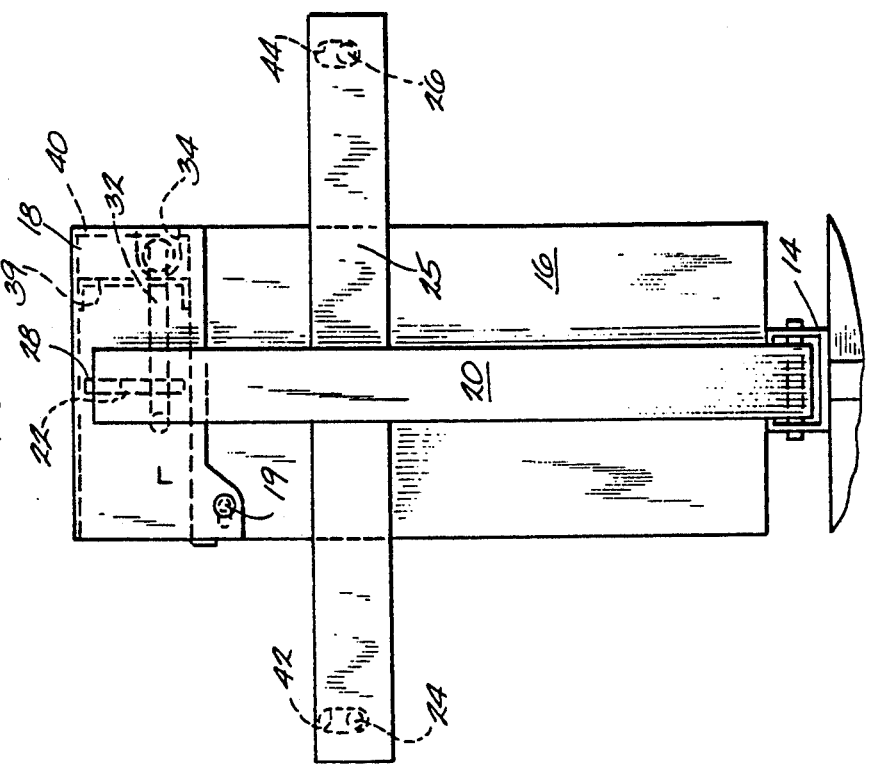

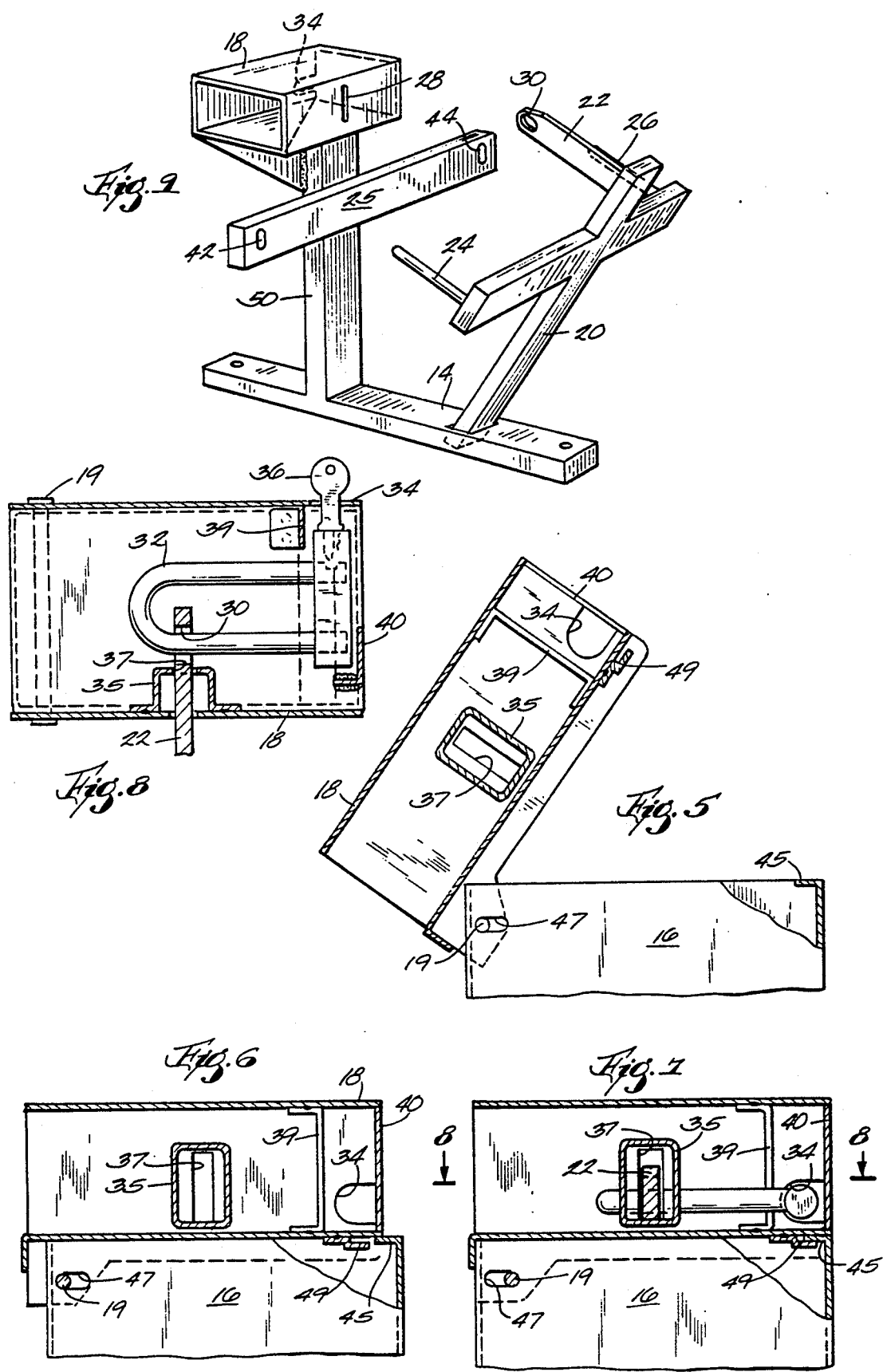

SECURITY BICYCLE STAND

FIELD OF THE INVENTION

This invention relates to bicycle stands. More particularly, the invention relates to such stands for stationary parking of bicycles that are provided with a secure theft resistant locking system and which may be combined with a storage locker.

BACKGROUND OF THE INVENTION

While bicycling has remained a healthful and non-polluting form of transportation, it has not been widely adapted for such activities such as commuting because of the problems caused by bicycles being an attractive target for theft. Another problem is that equipment such as helmets and backpacks carried by a cyclist are cumbersome in the event the cyclist wishes to park his bicycle, for example, at a bus or commuter train station in order to continue commuting to work.

Various proposals for bicycle stands with or without lockers have heretofore been suggested. See for example, U.S. Pat. Nos. 3,762,569; 3,827,773; 3,865,245; 3,964,611, 4,080,020; 4,830,167; and 5,040,385. In spite of these various suggested designs, a need yet exists for a simple but secure and theft resistant design for a bicycle stand.

SUMMARY OF THE INVENTION

The principal object of the present invention is to overcome the foregoing shortcomings and to provide a theft resistant stand suitable for location in such areas as commuter train stations, parking lots, and similar locations. According to one aspect of the invention, such a stand is provided that enables the use of a conventional U-shaped shackle lock frequently carried by cyclists to secure the bicycle in the stand. In a related aspect, the invention utilizes such a lock to secure the bicycle frame and both wheels by means of a single mechanism. A still further aspect of the invention is that the same lock can be used to lock a bicycle and a locker storage compartment in a theft resistant manner.

An further important aspect of the invention relates to providing a device wherein a shackle lock of a type conventionally carried by bicyclists can be used to secure the bicycle and is protected against access by tools such as bolt cutters or hack saws.

Briefly summarized, the invention provides a bicycle stand including a stationary upright member anchored to the ground and horizontally oriented openended enclosure of rectangular cross section attached to its top with an opening in one side thereof to receive a bicycle securing arm. A pivotable second member carrying three arms is adapted to engage a bicycle. One of the arms is aligned with and adapted to pass through the opening, an aperture to receive a leg of a shackle lock placed within the enclosure to lock the bicycle in the stand. A storage compartment can serve as one of the upright members and is secured by the same lock.

DRAWINGS

The invention will be further set forth in the following detailed description and accompanying drawings wherein:

FIG. 3 is a side elevational view of a bicycle stand of the invention;

FIG. 4 is an end view of the stand of FIG. 3 with phantom lines used to show the stand in the open position;

FIG. 5 is a fragmentary cross-sectional view showing the storage compartment in the open position;

FIG. 6 is a central fragmentary sectional view of the components of FIG. 5 pivoted downwardly;

FIG. 7 is a central cross-sectional fragmentary view of the components of FIG. 5 shown in the latched position where they lock in place;

FIG. 8 is a cross-sectional view of the compartment of FIG. 7 taken along line 8—8; and FIG. 9 is a perspective view illustrating a different embodiment of the invention.

DESCRIPTION OF A PREFERRED EMBODIMENT

Figure 1:
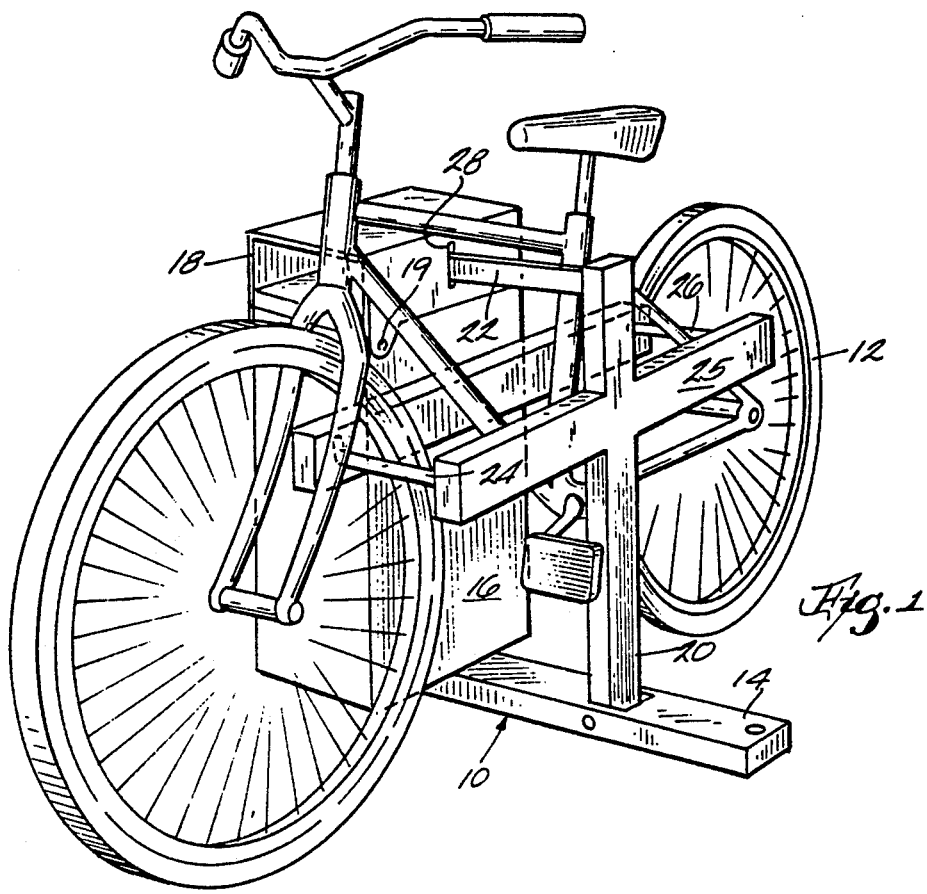
FIG. 1 is a perspective view of a bicycle stand of the present invention with a bicycle secured therein.
Figure 2:
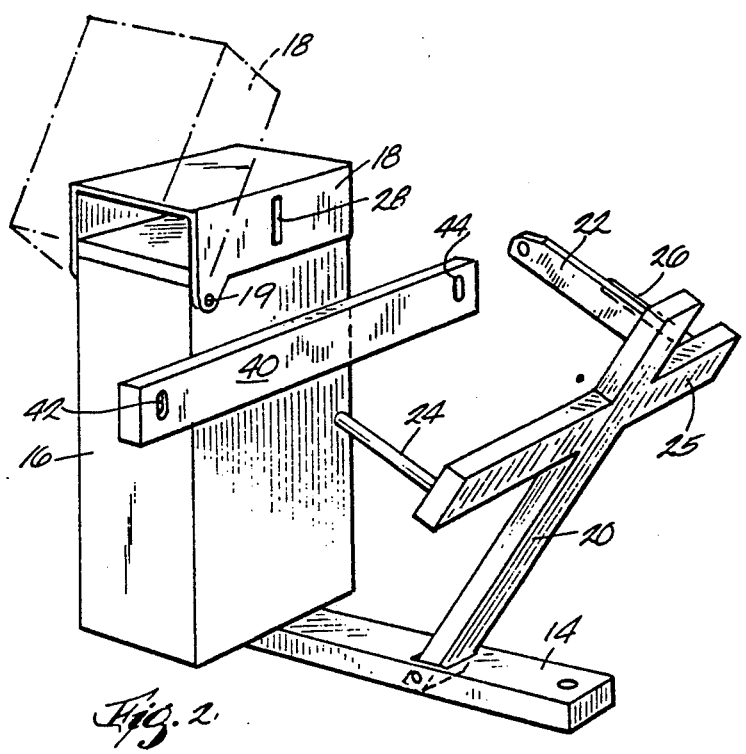
FIG. 2 is a perspective view of the stand of FIG. 1 with the bicycle removed with opening of the storage compartment thereof indicated by phantom lines.

Referring to the drawings there is seen in FIG. 1 a bicycle stand 10 with a bicycle 12 locked in place. Stand 10 includes a base member 14 which may be secured to the ground, for example, by bolts or by embedding the same in cement. In the embodiment of FIGS. 1-8 a first stationary upright member is in the form of an upright storage compartment 16 secured to base 14. A tunnel-shaped enclosure 18 is pivotally attached to the top of compartment 16 at pivot axis 19.

A second upright member 20 pivotally attached to base member 14 carries bicycle engaging arms 22, 24 and 26, a cross member 25 being provided to support the lateral arms 24 and 26. An opening in the form of slot 28 in the side of enclosure 18 is aligned with and receives arm 22 when upright member 20 is pivoted to the vertical position.

Arm 22 is provided with an aperture 30 to receive a lock 32. Preferably a slot 34 (or alternatively, a hole) is provided in the side of enclosure 18 in order to allow access of a key 36 into lock cylinder 38 of lock 32. Preferably an inner housing 35 is welded or otherwise attached to the interior of enclosure 18 in order to prevent movement of lock 32. Housing 35 is also formed with a slot 37 aligned with slot 28 to receive arm 22. While a conventional shackle lock is shown in FIGS. 7 and 8, it will be apparent that other padlocks could also be used in connection with the invention. Further baffles 39 and 40 are provided to further restrict movement of lock 32 and to make it inaccessible to bolt cutters.

A horizontal cross member or metal bar 40 is attached to the side of upright storage compartment 16. Horizontal bar 40 is provided with openings 42 and 44 which are aligned with and adapted to receive arms 24 and 26, respectively, when member 20 is pivoted to the vertical position. As best seen in FIG. 1, arm 22 is adapted to prevent removal of the central frame of bicycle 12 from the rack while arms 24 and 26 are adapted to hold the bicycle wheels in place and prevent removal thereof.

As best seen in FIGS. 5-7, security enclosure 18 also provides a door to close the top of compartment 16. The upper corner of compartment 16 opposite pivot point 19 is provided with a lip 45. It will be noted that pivot point 19, which may be defined by a single elongated bolt or rod or, alternatively, two separate rivets or bolts, is fitted in an elongated slot 47 so as to permit sliding of enclosure 18 to the left as seen in FIG. 6 or to the right as seen in FIG. 7. A clip 49 is welded or riveted to the bottom of enclosure 18 so that the free end of enclosure 18 can be retained in place when enclosure 16 is closed. As seen in FIG. 6, when clip 49 is disengaged from lip 45 enclosure 18 can be pivoted upwardly to the position shown in FIG. 5 to allow access to compartment 16. However, when enclosure 18 is pivoted downwardly to the position shown in FIG. 6 and then moved by sliding to the right to the position shown in FIG. 7, clip 49 engages lip 45 so that compartment 16 cannot be opened. Slot 34 is then aligned with arm 22. Arms 24 and 26 simultaneously enter openings 42 and 44. The presence of arms 24 and 26 in their respective openings prevents movement from side-to-side of upright 20. Thus, due to the close fit between arm 22 and slot 28 enclosure 18 cannot be moved to the left from the position shown in FIG. 7. Thus, with lock 32 in place enclosure 18 cannot be flipped upwardly to open compartment 16.

It is thus seen that lock 32 holds the bicycle in place while simultaneously locking compartment 16. Enclosure 18, preferably formed of a tough material such as rolled steel, stainless steel or the like, renders access to a lock 32 with a bolt cutter difficult unless enclosure 18 is first destroyed by some other means. The components of the stand can be coated with a thick resilient vinyl or similar plastic coating in order to provide protection to the finish of the bicycles.

In the further embodiment of FIG. 9, storage compartment 16 is eliminated and instead cross member 25 is attached to a stationary upright member 50 which may be a steel bar. Enclosure 18 is attached to the top of bar 50, for example, by welding. The embodiment of FIG. 9 provides a stand for securely locking a bicycle in theft resistant fashion without the added cost of storage compartment 16.

While preferred embodiments of the invention have been shown, it will be apparent to those skilled in the art that further modifications of the invention can be made without departing from the scope of the following claims or the spirit of the invention.

What is claimed is:

1. A bicycle stand comprising:
   a first upright member anchored to the ground, said first member having a horizontally oriented open ended tubular enclosure attached thereto, said enclosure having substantially closed surfaces forming said tubular enclosure and having an opening through one side thereof to receive a bicycle securing arm, the opposed end of said tubular enclosure having openings for insertion of a bicycle shackle lock into said enclosure,
   a second generally upright member located adjacent to the first upright member and being pivotally attached to a base member secured to the ground, said second upright member having at least one bicycle engaging arm aligned with and adapted to pass through said opening in said enclosure when said second member is pivoted to the upright position, said arm having an aperture to receive a leg of a shackle lock placed within said enclosure whereby said second member and a bicycle engaged thereby can be locked in said uprights by a lock located within said enclosure.

2. A stand according to claim 1 wherein:
   said second member carries three arms adapted to engage the frame and both wheels of a bicycle.

3. A stand according to claim 2 wherein: said arms comprise a forwardmost arm, a rearwardmost arm and a center arm, and,
   the center arm fits into said opening of said enclosure and a horizontal retaining bar is attached to said first upright member, said horizontal retaining bar being provided with openings to receive the forwardmost and rearwardmost of said arms when said second upright is pivoted to the upright position.

4. A stand according to claim 1 wherein:
   said enclosure is of rectangular cross section and is formed of rolled steel or stainless steel.

5. A stand according to claim 1 wherein each of said upright members comprises a metal post.

6. A stand according to claim 1 wherein:
   a hole is provided through one side of said enclosure for insertion of a key into a lock cylinder of a conventional U-shaped bicycle shackle lock positioned in said enclosure and locking said second member in the upright position.

7. A bicycle stand comprising:
   a first upright member anchored to the ground, said first member having a horizontally oriented open ended enclosure attached to the top end thereof said enclosure having an opening in one side thereof to receive a bicycle securing arm,
   a second generally upright member located adjacent to the first upright member and being pivotally attached to a base member secured to the ground, said second upright member having at least one bicycle engaging-arm aligned with and adapted to pass through said opening in said enclosure when said second member is pivoted to the upright position, said arm having an aperture to receive a leg of a shackle lock placed within said enclosure whereby said second member and a bicycle engaged thereby can be locked in said uprights by a lock located within said enclosure, and wherein:
   said first upright comprises a storage compartment and the bottom of said enclosure serves as a door to close the top of said compartment, said enclosure being pivotally attached to said compartment, said storage compartment also being secured in a closed position by said lock.

8. A stand according to claim 7 wherein said enclosure is pivoted about pivot points that are slidable relative to said compartment and means for retainably engaging a retaining means are provided on said enclosure spaced from said pivot points, said compartment being provided with a mating retaining means, wherein sliding of said enclosure toward said retaining means latches said door and sliding of said enclosure away therefrom permits pivoting of the enclosure to open said compartment.

9. A stand according to claim 8 wherein engagement of said bicycle-engaging arm in said opening prevents sliding of said enclosure and thereby prevents opening of said compartment.

10. A bicycle anchored to the ground comprising:
    first and second upright members, said first member being stationary and having a horizontally oriented open ended steel enclosure of rectangular cross section attached to the top end thereof and having an opening in one side thereof to receive a bicycle securing arm,
    said second generally upright member being located adjacent to the first member and being pivotally attached to a base member, said second upright member carrying three arms adapted to engage the frame and wheels of a bicycle, one of said arms being aligned with and adapted to pass through said opening in said enclosure when said second member is pivoted to the upright position, said one arm having an aperture to receive a leg of a shackle lock placed within said enclosure whereby said second member and a bicycle engaged thereby can be secured by a lock passing through said aperture and located within said enclosure, a hole being provided through said enclosure for insertion of a key into the lock, said first upright comprising a storage compartment attached thereto, the bottom of said enclosure serving as a door to close said compartment, said enclosure being pivotally attached to said compartment, whereby said storage compartment is also secured in a closed position by said lock, a horizontal retaining bar being attached to said first upright member, said horizontal retaining bar being provided with openings aligned to receive the other two of said arms when said second upright is pivoted to the upright position, said enclosure being pivotable about pivot points that are slidable relative to said compartment, a U-shaped clip being provided on said enclosure spaced from said pivot points, said compartment being provided with a lip mating with said clip, whereby sliding of said enclosure toward said lip secures said compartment and sliding of said enclosure away therefrom permits pivoting of the enclosure to open said compartment, engagement of said two arms in said openings in said horizontal retaining arm preventing sliding of said enclosure and thereby preventing opening of said compartment when a bicycle is locked in said stand.

11. In a bicycle stand having a storage compartment therein, the improvement wherein the closure for said compartment comprises a tunnel-shaped enclosure pivotally attached to a corner of said compartment, the opposite corner of said compartment having a lip, and said enclosure having a clip attached to its free end to engage said lip for latching said compartment closed, a bicycle retaining clamping member having a plurality of horizontal arms, said enclosure having an openings therethrough aligned with one of said arms, said one arm having an aperture therethrough to secure a bicycle to said stand and to lock said compartment closed by means of a lock engaging said one arm, said compartment having a horizontal member attached thereto which has at least one opening therethrough aligned with another of said arms, the positioning of said other arm in said opening preventing disengagement of said clip from said lip when said stand is locked.

* * * * *

UNITED STATES PATENT AND TRADEMARK OFFICE
CERTIFICATE OF CORRECTION

PATENT NO.   : 5,323,915
DATED        : June 28, 1994
INVENTOR(S)  : Fortune, Sr. et al It is certified that error appears in the above-indentified patent and that said Letters Patent is hereby corrected as shown below:

Column 4, line 60, claim 10, after "bicycle" insert --stand --.

Signed and Sealed this

Twenty-fifth Day of April, 1995

Attest:

BRUCE LEHMAN

*Attesting Officer*        *Commissioner of Patents and Trademarks*